J. FLIEGEL.
SPRING WHEEL.
APPLICATION FILED JULY 2, 1908.

923,161.

Patented June 1, 1909.
3 SHEETS—SHEET 1.

WITNESSES:
Edw. D. Spring
W. P. Burke

INVENTOR
Josef Fliegel
By
ATTY.

J. FLIEGEL.
SPRING WHEEL.
APPLICATION FILED JULY 2, 1908.

923,161.

Patented June 1, 1909.
3 SHEETS—SHEET 2.

WITNESSES
W. P. Burk
L. Hajek

INVENTOR
Josef Fliegel
BY Wm Wallace White
ATTY

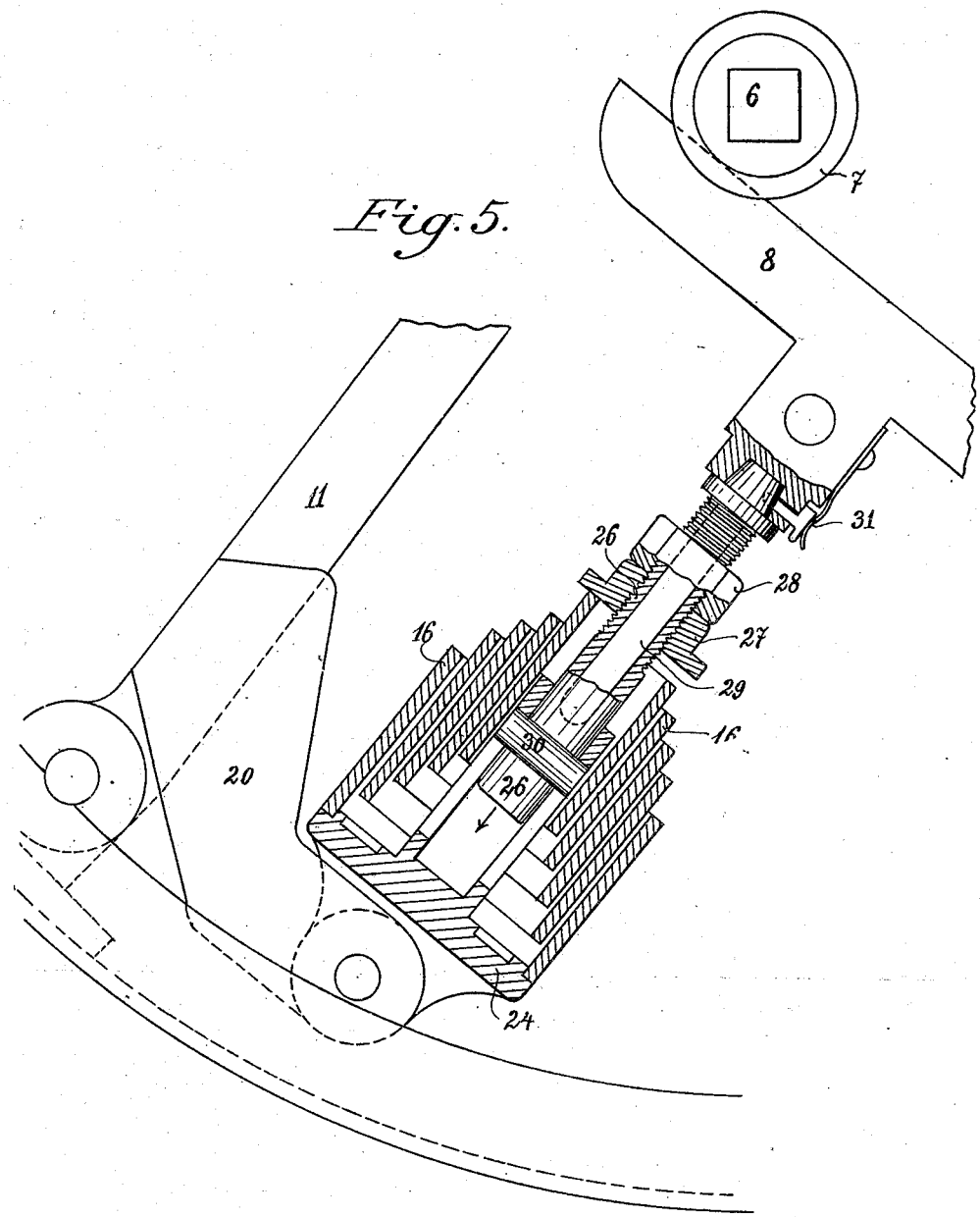

UNITED STATES PATENT OFFICE.

JOSEF FLIEGEL, OF MALLMITZ, GERMANY.

SPRING-WHEEL.

No. 923,161.      Specification of Letters Patent.      Patented June 1, 1909.

Application filed July 2, 1908. Serial No. 441,666.

*To all whom it may concern:*

Be it known that I, JOSEF FLIEGEL, subject of the German Emperor, residing at Sprottauer Chaussee, Mallmitz, Germany, have invented new and useful Improvements in Spring-Wheels, of which the following is a specification.

This invention relates to a wheel having its hub free from the rim and levers connected to said rim and engaging the hub.

According to the invention, the levers provided with straight faced abutments bear tangentially against the periphery of the hub and are held in this position by springs, which are arranged in such a manner that they abut the neighboring lever with a bell crank lever and consequently always bear on the preceding lever.

In conformity with the yielding capacity of the springs acting as buffers, the hub is therefore adapted to shift eccentrically in the plane of the wheel rim. In order that with such eccentric displacement, the buffer springs at the opposite side may only act on the levers up to a certain limit, the springs are limited in their extensive or expansive capacity. Consequently, the spring which is underneath and supports the hub with its lever is not influenced by the oppositely located spring. The springs are so tensioned that each lever can practically bear the load of the axle.

The yielding of the hub with respect to any jerking action is assisted by the supporting levers forming in the forward and rearward direction of movement inclined planes along which the hub slides. During this sliding movement, a descent of the hub from the center of the wheel takes place, which would materially impede running if the hub maintained the lowered position. Now by the arrangement of the levers and springs, the hub is raised in due time not merely by that spring which counteracts the actual supporting lever but also by the lever itself being returned to the central position with the aid of the next following lever, whose spring has been previously tensioned by the supporting lever during its descent.

Figure 1:
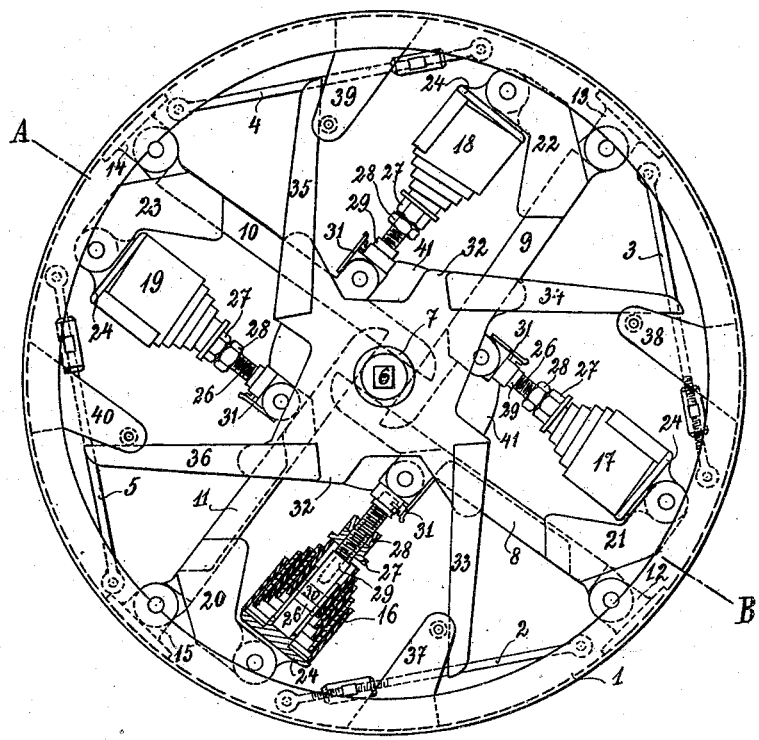
Figure 4:
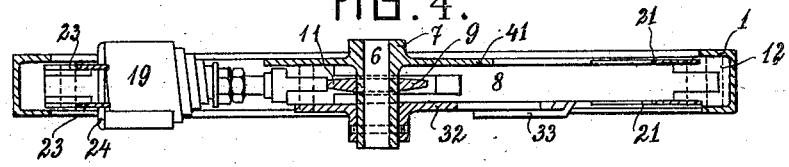
Figure 2:
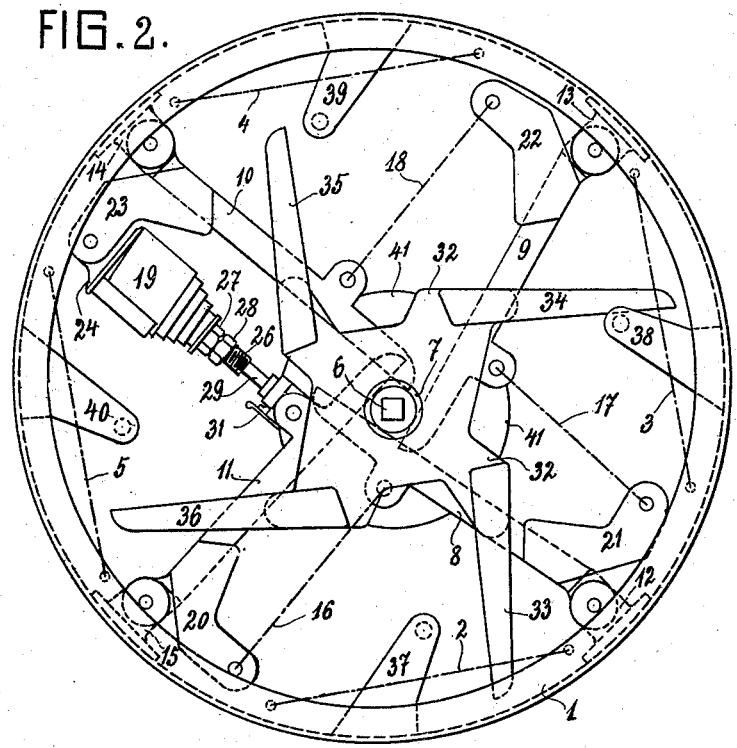
Figure 3:
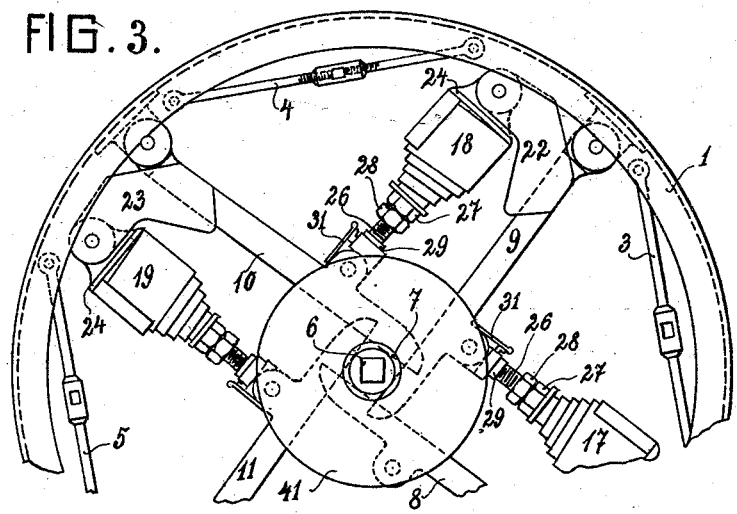

Referring to the accompanying drawing, Figure 1 shows the side elevation of the wheel one of the springs being represented in section; Fig. 2 shows diagrammatically the most eccentric position, which the wheel hub may assume in the event of an extraordinary strong jerk; Fig. 3 is an elevation of the wheel without drivers and Fig. 4 is a section on line A—B of Fig. 1. Fig. 5 is an enlarged sectional detail view of the spring and its coöperating parts.

The rigid rim 1 is preferably of U-shaped cross-section and is kept in permanent tension by the tie bolts or braces 2, 3, 4, 5. The wheel hub 7 secured on the axle 6 forms the abutting surface for the levers 8, 9, 10, 11. These levers engage tangentially with their free ends the hub 7 having straight faced abutments for that purpose and the said levers are pivoted at 12, 13, 14, 15 to the rim 1. The appropriate pressure toward the center of the wheel is imparted to the levers by the springs 16, 17, 18, 19. Each spring is detachably connected with its corresponding lever and adapted to oscillate on a bracket (Fig. 1, 20, 21, 22, 23) that is secured to the neighboring lever.

As shown in Fig. 1 by the sectional view of the one spring, each spring such as 16 acting on the lever 8 is mounted on the base of a guiding sleeve 24, which is articulated with the bracket 20. The latter is secured to the neighboring lever 11. The spring bolt 26 is slidably arranged longitudinally in the sleeve 24. A stop pin 30 inserted transversely in the bolt 26 and entering longitudinal slots of the sleeve 24 controls the longitudinal movement of the bolt 26 and consequently serves for limiting the stroke of the spring. The spring tension is so adjusted by turning nut 27 and check-nut 28 that each spring in itself is adapted to bear practically the full pressure of the axle. In the ordinary working system, however, the load is also distributed on two neighboring levers. The spring bolt 26 has at the top end a longitudinal bore wherein the stem 29 is fitted which with a conical head enters a socket member of the lever 8 and is locked therein by the flat spring latch 31. By loosening the nuts 27, 28, the spring 16 becomes slack and the spring bolt 26 may move downwardly in the sleeve 24 so that when the spring latch 31 is released, the conical head of the stem 29, can be disengaged from the socket of the lever 8. The spring with its guiding sleeve may then be tilted away. As soon as the stem 29 is taken out and the nuts 27 and 28 are removed, the spring 16 can be readily dismounted for being replaced. The hub 7 is provided on both sides with the flanges 32, 41 (Fig. 4) between which the levers 8, 9, 10, 11 are guided, so as to prevent their lateral displacement. As propelling means, in the case of the wheel being a driving wheel, four drivers 33, 34, 35, 36 are secured on the flange 32. These drivers bear against the brackets 37, 38, 39, 40 which are secured to the rim 1. Fig. 2 represents the most eccentric position, according to which in consequence of the constant tendency of the hub to move forwardly and downwardly the drivers operate consecutively but only in a forward driving direction.

Having now particularly described and ascertained the nature of my said invention and in what manner the same is to be performed, I declare that what I claim and wish to secure by Letters Patent is:—

1. A wheel having a hub, a rim, levers pivoted to the rim and bearing tangentially against the hub, and springs connecting each lever to the adjacent lever.

2. A wheel comprising a hub and a rim, levers pivoted to the rim and extending inwardly and bearing tangentially against the hub, a bracket secured to the outer end of each lever, and a spring carried by each bracket and engaging the adjacent lever.

3. A wheel comprising a hub and a rim, levers pivoted to the rim and extending inwardly and bearing tangentially against the hub, a bracket carried by the outer end of each lever, a casing pivoted to said bracket, a spring in said casing, and a bolt secured to the outer end of said spring and engaging the inner end of the adjacent lever.

4. A wheel comprising a hub and a rim, levers pivoted on the rim and extending inwardly and bearing against the hub, a bracket secured to the outer end of each lever, a casing carried by said bracket, a spring in said casing, a bolt carried by said spring, a stop pin carried by the bolt for limiting the movement thereof, a head on the bolt, a socket on the adjacent lever into which the head fits, and a spring catch for holding the head in the socket.

5. A wheel comprising a hub and a rim, levers pivoted on the rim and extending inwardly and bearing against the hub, brackets on the outer ends of each lever, springs supported on said brackets and engaging the adjacent lever, drivers secured to the hub extending outwardly, and projections on the rim adapted to be engaged by said drivers.

In testimony whereof I have signed my name to this specification in the presence of two subscribing witnesses.

JOSEF FLIEGEL.

Witnesses:
 HENRY HASPER,
 WOLDEMAR HAUPT.